Patented Nov. 10, 1953

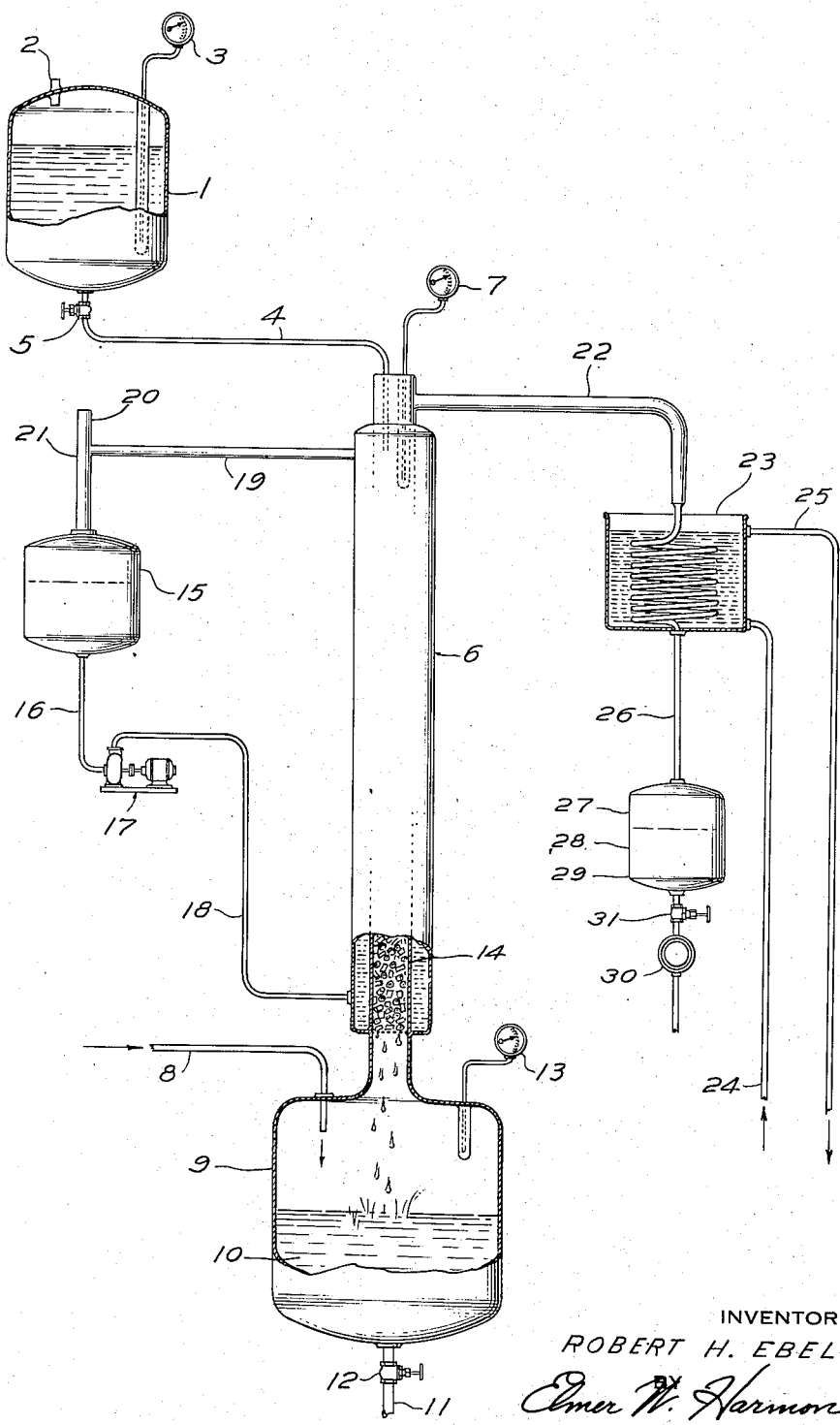

2,658,864

UNITED STATES PATENT OFFICE 2,658,864

PURIFICATION OF MERCAPTOTHIAZOLES

Robert H. Ebel, Plainfield, N. J., assignor to American Cyanamid Company, New York, N. Y., a corporation of Maine Application December 23, 1949, Serial No. 134,812

4 Claims. (Cl. 202—46)

This invention relates to the preparation of mercaptothiazoles. More particularly, it is concerned with a method of purifying mercaptobenzothiazoles to convert the crude product to a form more acceptable commercially.

Mercaptoarylenethiazoles, particularly as exemplified by the 2-mercaptobenzothiazoles, have been found to be particularly useful as accelerators in the vulcanization of rubber. As a result, many processes have been developed for the commercial preparation of these compounds. Of these, probably the most successful and widely used has been that of U. S. Patent 1,631,871 to Kelly, or modifications thereof. According to that process, primary aromatic amines are reacted with carbon bisulfide and sulfur.

The product which is obtained, however, contains a number of impurities. Accordingly, mercaptoarylenethiazoles, as so produced, ordinarily must be given some type of purification treatment previous to sale and use. Heretofore, this has most commonly consisted in treating the crude product with caustic soda, to dissolve the crude product. Any undissolved material is removed by filtration. The filtrate is then acidified to precipitate the final product.

While this treatment is widely and commonly practiced as the principal method of purification, unfortunately it does not completely eliminate the impurities. The latter are extremely difficult to remove. Most of them, as they occur in manufacturing, are soluble to a significant extent in aqueous caustic soda solution. Accordingly, the resultant product is usually yellow or brown in color, and has a disagreeable odor. While more pure material can be obtained by crystallization from other solvents, the use of the latter, in ordinary practice, is economically impractical.

Purification by using other alkaline substances than caustic soda solution has also been suggested. Again, the results here have not been wholly satisfactory. Purification when so attempted usually is not sufficiently selective. In many cases, an inordinately large reaction volume is required. This in itself makes such a method economically impractical.

It is, therefore, the principal object of the present invention to devise a purification procedure which is not subject to these difficulties. Preferably, the process should yield a product suitable for commercial use without further purification. Preferably, also, the process should be capable of converting in a single-step operation, without the wasteful consumption of acid and alkali of the usual practice, a crude product of the Kelley process, or similar modifications, into an acceptable product.

In general, these objects are accomplished by the use of suitably-controlled steam distillation. This procedure volatilizes the impurities under controlled conditions. The still residue comprises a highly purified product.

Successful operation of this procedure differs considerably from steam distillation and purification as previously practiced in the art. Steam distillation has been tired as a method of purifying mercaptobenzothiazoles. However, it has always been carried out on an aqueous alkaline solution of the thiazole. This was done in order to take advantage of the well-known involatile nature of the alkali metal salts of these and similar mercapto compounds.

Because of the difficulties involved, such processing has not been developed to any appreciable extent. It is quite surprising, in view thereof, that a thorough and highly selective separation of benzothiazole from the mercaptobenzothiazole can be made simply by stripping the product directly obtained from the treatment of the primary aromatic amine.

In addition to the fact that the present process gives the surprisingly effective purification, the process has a number of additional advantages. It eliminates the necessity for alkalizing the mercaptobenzothiazole before the stripping. It also eliminates acidification, filtering, washing, and drying after the stripping. Merely in eliminating all three steps, the present invention provides a simple but marked advance in the art.

However, the present process also avoids the undesirable procedure of subjecting mercaptobenzothiazole to high temperatures in alkaline solutions. Under the latter conditions, the material is highly susceptible to side reactions, particularly by hydrolysis and oxidation. The purified product obtained according to the present invention, in a single step, is adequately purified for use without further treatment in almost all commercial practices.

While the general principle of the general process is simple, its practice requires considerable care. Temperature control is absolutely necessary to obtain the best results. At too low temperatures, contact with steam is not sufficiently intimate and the vapor pressure of the impurities is too low. A sufficient degree of purification is not realized. On the other hand, if too high a temperature is used, decomposition of mercaptobenzothiazole becomes excessive, resulting in inordinate losses of material and an increased contamination. In practice, optimum results are obtained by operating at the temperature from 170°–240° C. Agitation during this treatment is desirable but is not absolutely essential.

Exposure time during distillation varies considerably and is particularly dependent upon the operating temperature. It is neither necessary nor practically possible to assign limits on exposure time which hold good for all conditions. In general, the higher the temperature the greater the tendency toward decomposition. Therefore, the preferred operating time is the shortest possible. At about 240° C., the distilling time for ordinary crude batches as obtained in the Kelley process, or the like, should not materially exceed ten minutes. At 210° C., this time may be safely increased to about 30 minutes. At lower temperatures, proportionately longer periods are admissible.

In general, the best and most economical results are obtained by using a correct amount of steam in proportion to the weight of crude starting material. A good practice will utilize from between one-tenth to about twice the weight of the crude starting material. To use greater amounts is inherently uneconomical and tends to promote descomposition. Smaller quantities lengthen the time cycle of operation; therefore, while decomposition tendency is decreased by using lower temperatures, the fact that the time cycle is longer offsets a good part of the advantage. In addition, the equipment is not used at optimum capacity.

It is an additional feature of the present invention that it is well adapted to continuous operation. When used in this manner, it is possible to obtain increased capacity, economy, and convenience from any given set of apparatus. A suitable apparatus is readily constructed. A suitable combination for the purpose is shown in the accompanying drawing. The latter constitutes a simplified flowscheme utilizing the normal minimum of apparatus.

As will be seen from the drawing, a tank 1 is provided as a reservoir for a supply of the preferred starting material. This is preferably a molten mercaptothiazole. Accordingly, the tank is provided with an inlet 3 for the addition of material, and with a temperature indicator 3, to permit the operator to insure the crude material remaining molten. Some conventional heating means, omitted from the drawing for simplicity, is ordinarily provided.

Molten crude is withdrawn from the bottom of the reservoir through conduit 4, in amounts regulated by a suitable valve 5. It is normally fed into the top of a suitably packed column 6. The desired operating temperature, as noted above, should be maintained between about 170°–240° C. Accordingly, the column is also equipped with a temperature indicator 7 to permit observing and maintaining this condition.

As the crude melt moves down through column 6, it is in intimate contact with a rising column of steam. The latter is introduced through conduit 8 into a vapor space which constitutes the upper part of a reservoir or receiver 9. This receiver is an enlarged section which comprises the bottom of packed tower 6. The steam is preferably, but not necessarily, superheated. The lower section of reservoir 9 will contain an appreciable body 10 of molten mercaptobenzothiazole. It is drawn therefrom, as needed, through conduit 11, in amounts controlled by a suitable valve 12. The receiver is also equipped with a temperature indicator 13, to insure that the product is maintained in molten condition.

Column 6 is normally packed, to lengthen and insure the time and degree of contact between the molten thiazole and the rising steam. This is preferably done with ceramic packing, such as Raschig rings, or their mechanical equivalent. It is also equipped with an outer jacket 14, through which a suitable heating liquid, diphenyl or the like is circulated to maintain the necessary temperature. Heated liquid is circulated through this jacket from a suitable heating tank 15, through conduit 16, pump 17, and inlet conduit 18. It returns to tank 15 through the exit conduit 19. The latter preferably is joined to tank 15 and a conduit 20 through T 21. In this way, heating fluid can be introduced into tank 15 as needed. Vapors also can be vented through conduit 20, if necessary.

Column 6, at its head, is equipped with a sidearm vapor takeoff 22. Vapors passing out through the latter are passed through a suitable condenser 23, using, in the latter, a suitable cooling fluid introduced through conduit 24, and removed through conduit 25. Condensate is taken through conduit 26 to suitable chamber 27, of sufficient volume so that the condensate may separate into a lower layer 29 and an upper water layer 28, principally comprising benzothiazole itself. Material is removed from tank 27 by means of conduit 30, in amounts regulated by valve 31. It is believed that the operation of the apparatus, as so shown, is clearly apparent.

In many cases, the condensate other than water will be principally benzothiazole, as noted. It is of considerable value, particularly as an inhibitor for the oxidation of metals. It may be readily separated from the aqueous portion 28 by decanting, using the conduit 30 and valve 31. It can be purified, if so desired, by washing with caustic soda.

The invention will be more fully discussed in conjunction with the following examples which are intended as illustrative only and not by way of limitation. Except as noted, all parts are by weight.

*Example 1*

Into a distilling vessel equipped with agitator and a steam leg was placed 600 parts of crude mercaptobenzothiazole produced by the Kelley process of U. S. Patent 1,631,871. This was then melted and heated to 210° C., a hydrogen sulfide atmosphere being provided to minimize thermal decomposition. Superheated steam was then fed through the molten material at such rate as to collect 70 parts per minute of aqueous condensate. Over 5 minutes' period, the heavy oil was collected, consisting principally of benzothiazole. The stripped melt was poured out to solidify. The product before stripping was found to comprise 93.94% pure mercaptobenzothiazole. After stripping, 572 parts were obtained, having a purity of 97.14%. The purified material was pulverized readily and reduced to minus 100 mesh. This treatment was impossible with the crude, because of the sticky nature thereof. Distillate consisted of 385 parts water and 21.3 parts crude benzothiazole. The latter was separated from the water layer by decantation, washed with 100 parts of 2% aqueous caustic soda and three washings with water. 17.5 parts of 88% pure benzothiazole was obtained.

Example 2

A packed column, packed with ceramic Raschig rings, equivalent to 5.25 theoretical plates, was assembled. The top of the column was fitted with a vapor takeoff leading to a condensor and to feed line for introducing molten material. The lower end of the end discharged into closed vessel equipped with a top inlet for superheated steam. The column was heated by circulating through its jacket at 200° C. a eutectic mixture of diphenyl and diphenyl oxide. Superheated steam, at 190° C., was passed through the lower closed vessel up the column, and to the condenser, at a feed rate sufficient to give 12 parts of condensate per minute. Molten crude 2-mercaptobenzothiazole, heated to 225° C., was introduced into the top of the column. At thermal equilibrium conditions, the molten crude was passed down the column countercurrently to the rising steam. The feed rate of approximately 90 parts per minute was maintained, 5400 parts being passed through in approximately 65 minutes. The condensate was first separated, yielding 162.5 parts of benzothiazole and 785 parts of aqueous condensate. The purity of the molten 2-mercaptobenzothiazole collected in the bottom receiver was several percent greater than that of the crude as produced in the top of the column.

I claim:

1. In the method of working up 2-mercaptobenzothiazole, containing benzothiazole as an impurity, prepared by reacting aniline, carbon bisulfide, and sulfur, the improved method of removing benzothiazole which consists of subjecting the molten product to distillation with steam at temperatures of 170-240° C. for sufficient time to recover substantially all benzothiazole without decomposition of mercaptobenzothiazole.

2. Process according to claim 1 in which the steam distillation is carried out, using from 0.1-2.0 times by weight of steam of the weight of molten 2-mercaptobenzothiazole treated.

3. Process according to claim 1 in which the steam distillation is accomplished by passing the molten crude 2-mercaptobenzothiazole countercurrently against a stream of superheated steam, collecting the stripped product, and collecting and condensing the effluent vapors.

4. Process according to claim 3 in which the condensate is separated into an aqueous and a non-aqueous layer, the non-aqeous layer being washed with dilute aqueous caustic soda, water, and then dried.

ROBERT H. EBEL.

References Cited in the file of this patent

UNITED STATES PATENTS

| Number | Name | Date |
|---|---|---|
| 1,631,871 | Kelly | June 7, 1927 |
| 1,858,344 | Scott | May 17, 1932 |
| 2,090,233 | Roberts | Aug. 17, 1937 |
| 2,161,741 | Gage | June 6, 1939 |

OTHER REFERENCES

Morton: "Laboratory Technique in Organic Chemistry," published, 1938, by McGraw-Hill Book Company, Inc., New York, New York; pages 144 and 145.